US010659550B2

(12) United States Patent
Musumeci et al.

(10) Patent No.: US 10,659,550 B2
(45) Date of Patent: May 19, 2020

(54) FIXED DELAY STORAGE AND ITS APPLICATION TO NETWORKED ADVERTISEMENT EXCHANGE

(71) Applicant: Oath Inc., New York, NY (US)

(72) Inventors: Gian-Paolo Musumeci, Berkeley, CA (US); Sharon Paisner, Berkeley, CA (US); Kevin Su, Mountain View, CA (US)

(73) Assignee: Oath Inc., New York, NY (US)

( * ) Notice: Subject to any disclaimer, the term of this patent is extended or adjusted under 35 U.S.C. 154(b) by 483 days.

(21) Appl. No.: 14/508,944

(22) Filed: Oct. 7, 2014

(65) Prior Publication Data

US 2016/0100026 A1    Apr. 7, 2016

(51) Int. Cl.
*H04L 29/08* (2006.01)
*G06Q 30/02* (2012.01)

(52) U.S. Cl.
CPC ..... *H04L 67/2842* (2013.01); *G06Q 30/0277* (2013.01); *H04L 67/1097* (2013.01)

(58) Field of Classification Search
CPC . H04L 67/2842; H04L 67/1097; H04L 67/20; G06Q 30/0277
See application file for complete search history.

(56) References Cited

U.S. PATENT DOCUMENTS

| | | | | |
|---|---|---|---|---|
| 5,032,987 A * | 7/1991 | Broder | ............... | G06F 15/161 707/E17.036 |
| 6,449,695 B1 * | 9/2002 | Bereznyi | ............... | G06F 12/123 707/E17.12 |
| 8,468,134 B1 * | 6/2013 | McHugh | ............... | G06F 17/30489 707/638 |
| 8,825,937 B2 * | 9/2014 | Atkisson | ............... | G06F 12/0246 711/102 |
| 9,009,429 B2 * | 4/2015 | Kapanipathi | ......... | G06F 3/0608 711/162 |
| 9,531,829 B1 * | 12/2016 | Anand | ............... | H04L 67/2842 |
| 9,847,917 B2 * | 12/2017 | Varney | ............... | H04L 41/50 |
| 2004/0083347 A1 * | 4/2004 | Parson | ............... | G06F 17/30949 711/165 |

(Continued)

OTHER PUBLICATIONS

International Search Report and Written Opinion issued in corresponding application PCT/US2015/048804, dated Nov. 27, 2015, pp. 1-2.

(Continued)

*Primary Examiner* — Patrice L Winder
*Assistant Examiner* — Angela M Wildham De Rodrig
(74) *Attorney, Agent, or Firm* — Cooper Legal Group, LLC

(57) ABSTRACT

Methods and systems for fixed delay storage operations such as lookup and insertion and their applications to advertisement exchange systems are disclosed. In one aspect, a method is provided for inserting a key into a corresponding location in a storage within a fixed delay. The method may determine the corresponding location for inserting the key by a first hashing function and a second hashing function. The method may also utilize an eviction criterion for evicting collided hashed values of the key to ensure the insertion time for operations related to inserting the key to be bounded by a fixed delay, which may be within a fixed time interval, or within a fixed number of steps.

24 Claims, 6 Drawing Sheets

(56) References Cited

U.S. PATENT DOCUMENTS

| | | | | |
|---|---|---|---|---|
| 2006/0092867 A1* | 5/2006 | Muller | H04H 20/16 | 370/312 |
| 2008/0126741 A1* | 5/2008 | Triplett | G06F 9/526 | 711/216 |
| 2009/0182847 A1* | 7/2009 | Suzuki | G11B 27/034 | 709/219 |
| 2010/0057560 A1* | 3/2010 | Skudlark | G06Q 30/02 | 705/14.49 |
| 2013/0013844 A1* | 1/2013 | Venkatesh | G06F 17/30132 | 711/6 |
| 2013/0275391 A1* | 10/2013 | Batwara | G06F 16/125 | 707/689 |
| 2013/0275656 A1* | 10/2013 | Talagala | G06F 12/0246 | 711/103 |
| 2013/0290643 A1* | 10/2013 | Lim | G06F 16/24552 | 711/144 |
| 2014/0325115 A1* | 10/2014 | Ramsundar | G06F 12/0238 | 711/102 |
| 2015/0052309 A1* | 2/2015 | Philip | G06F 12/0864 | 711/128 |
| 2015/0067819 A1* | 3/2015 | Shribman | H04L 67/06 | 726/12 |
| 2016/0203053 A1* | 7/2016 | Talagala | H04L 67/1097 | 714/6.12 |

OTHER PUBLICATIONS

Translation of Examination Opinions dated Nov. 14, 2016 for corresponding TW Application No. 104131577, 6 pages.

\* cited by examiner

US 10,659,550 B2

FIXED DELAY STORAGE AND ITS APPLICATION TO NETWORKED ADVERTISEMENT EXCHANGE

TECHNICAL FIELD

This document generally relates to data caching.

BACKGROUND

Many companies seek to attract customers by promoting their products or services as widely as possible. Online advertising is a form of promotion that uses the Internet and World Wide Web to attract customers. Online advertising is often facilitated through companies such as online advertising networks that connect advertisers to web sites that want to sell advertising space. An advertising network typically aggregates advertisement space supply from publishers and matching it with advertiser demands. Advertisement exchange systems are technology platforms used by online advertising networks, agencies, advertisers, and others for buying and selling online advertisement impressions. Advertisement exchange systems can be useful to both buyers (advertisers and agencies) and sellers (online publishers) because of the efficiencies they provide.

Due to real-time, high volume nature of online advertisement insertion marketplace, advertisement exchange systems receive, store, process and transmit large volumes of data.

SUMMARY

This document disclosed technology that can be used to improve the efficiency of data caching and storage operations. In some embodiments, the disclosed technologies can be used in a video advertisement insertion system for processing of advertisement insertion data and generating billing information in real time.

In one aspect, a method is provided for inserting a key into a corresponding location in a storage, which may be a cache, within a fixed delay. The method may determine the corresponding location for inserting the key by a first hashing function and a second hashing function. The method may also utilize an eviction criterion for evicting collided hashed values of the key to ensure the insertion time for operations related to inserting the key to be bounded by a fixed delay.

In some embodiments, the key being inserted has an associated time stamp, the fixed delay bounding the insertion of the key may be a fixed time interval, and the insertion time for operations related to inserting the key may be within the fixed time interval. In some other embodiments, the fixed delay bounding the insertion of the key may be a fixed number of steps, and the insertion time for operations related to inserting the key may be within the fixed number of steps.

In some embodiment, the key been searched and inserted may include a local identifier, an entry of the storage may include a pair of a local identifier and an associated private identifier, and the key may be inserted into the storage with its associated private identifier. In some embodiment, the local identifier may be an identifier of a client device by a first system, and the private identifier may be an identifier of the client device by a second system. Furthermore, the private identifier may be stored in the second system connected to the storage by a network. The device having the storage may further retrieve through the network a set of behavior stored in the second system corresponding to the private identifier, and distribute an advertisement to the client device based on the retrieved set of behavior.

In some embodiment, each entry in the storage may have an associated time stamp; and the eviction criterion for evicting collided hashed values generated by the first hashing function and the second hashing function of the key being inserted is to evict an entry inspected during operations related to inserting the key that is expired based on its associated time stamp. In some other embodiment, the eviction criterion for evicting collided hashed values generated by the first hashing function and the second hashing function of the key is to evict an entry in a location inspected at a fixed number of steps. Yet in some other embodiment, the eviction criterion for evicting collided hashed values generated by the first hashing function and the second hashing function of the key is to evict an entry in a location that is closest to its expiration time among all locations been inspected during operations related to inserting the key.

These and other aspects, features and their implementations and variations are described in greater detail in the drawings, the description and the claims.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the subject matter. It will be obvious, however, to one ordinarily skilled in the art that the embodiments of the present disclosure may be practiced without some of these specific details. In other instances, well-known structures and techniques have not been shown in detail so as not to obscure the disclosure.

Figure 1A:
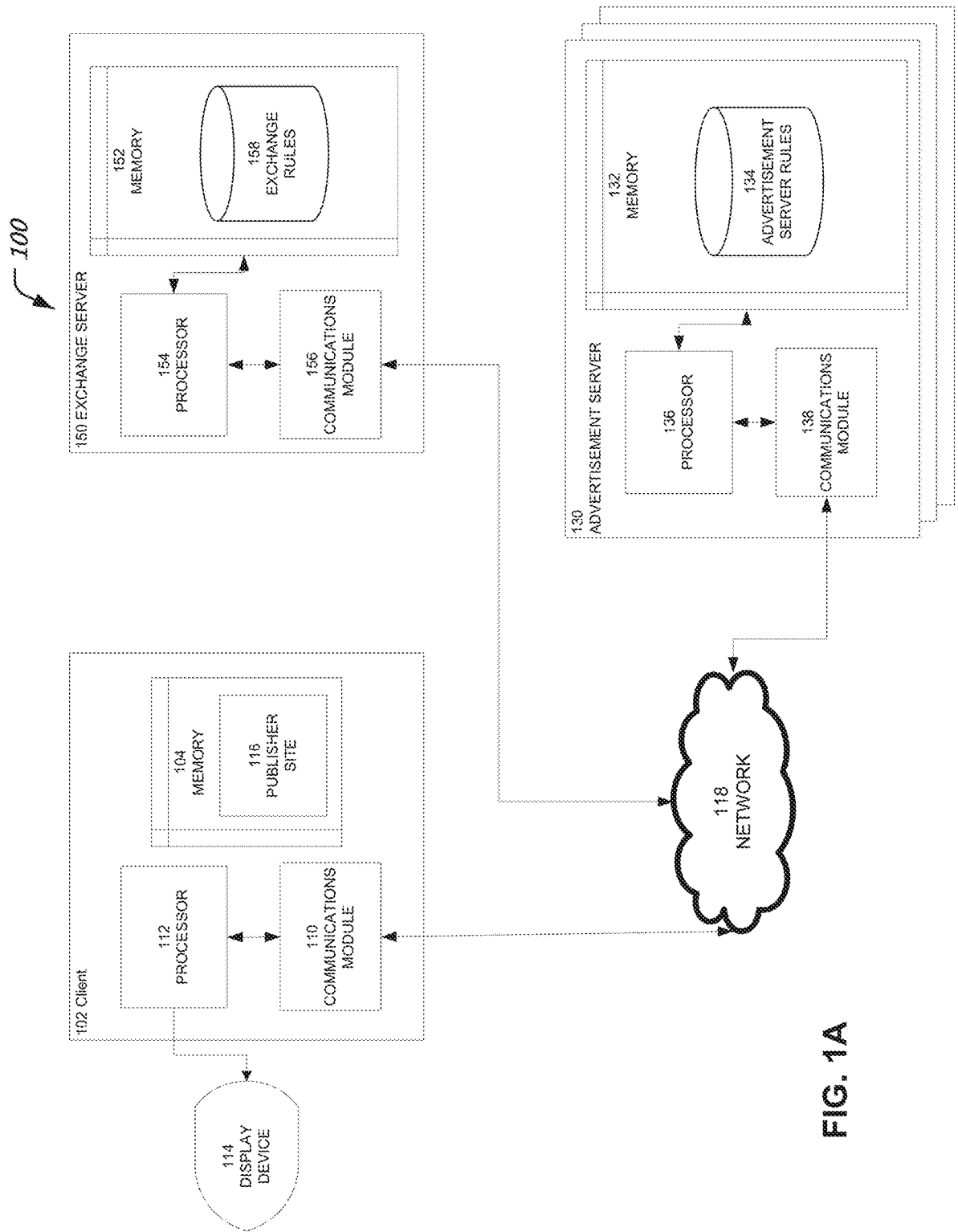
FIGS. 1A, 1B, and 1C illustrate an exemplary architecture for an advertisement exchange system.

FIG. 1A illustrates an exemplary architecture for an advertisement exchange system 100. The architecture includes a client 102, an exchange server 150 (the "networked advertisement exchange system" or "advertisement exchange platform"), and a plurality of advertisement servers, represented by exemplary advertisement server (or simply ad server) 130. The advertisement server 130 is associated with advertisements for one or a plurality of advertisers (or "buyers"). The client 102 can be, for example, a desktop computer, a mobile computer, a set top box (for a television), a video game console, a mobile device, or any other device having an appropriate display device 114.

The client 102, the exchange server 150, and the advertisement server 130 are connected over a network 118 via respective communications modules 110, 156, and 138. The network 118 can be, for example, a Local Area Network such as a private communications network or a Wide Area Network such as the Internet. The communications modules 110, 156, and 138 can be, for example, modems or Ethernet cards.

The exchange server 150 includes a processor 154, the communications module 156, and a memory 152 that includes exchange rules 158 (or "a set of exchange rules") that may be implemented in various ways, such as by using any combination of databases or tracking modules (e.g., "cookies"). The processor 154 of the exchange server 150 is configured to execute instructions, such as instructions physically coded into the processor 154, instructions received from software in memory 152, or a combination of both. For example, the processor 154 of the exchange server 150 is configured to receive an advertisement request, from a site or "publisher" (e.g., web site) being viewed on the client 102, to display an advertisement on the client 102, such as a request for a video advertisement. Other types of advertisements can be requested and processed by the exchange server 150, such as, and without limitation audio advertisements, image advertisements, in-game advertisements, interactive advertisements. The advertisement request may thus, in certain embodiments, be generated by the site, but then transmitted via the client 102 to the exchange server 150 using the processor 112 of the client and the communications module 110.

In certain embodiments, the advertisement request to the exchange server 150 includes an IP address (e.g., for geographic location or "geo-targeting" of the client 102), advertisement format information (e.g., a size, duration, and/or encoding format of an acceptable advertisement), and publisher site information for the site 116 that will display, on the client 102, the advertisement (e.g., the web site address or the type of web site) (hereinafter "publisher site 116" or "publisher 116," an illustrated in FIG. 1A as having been loaded into the memory 116 of the client 102, such as by a web browser). In certain embodiments, the advertisement request to the exchange server 150 also includes pricing information (e.g., a lowest price or "floor" that the publisher site 116 is willing to accept as payment to display the advertisement), historical information (e.g., tracking modules that include identifying information of the client 102, such as a past browsing history of the client 102), or client information. The request is issued from, for example, the publisher site 116 using a web browser or an Adobe Flash® player stored in the memory 104 of the client 102. As discussed herein, the requests and responses for information between the client 102, exchange server 150, and advertisement servers 130 are appropriately formatted to facilitate communication. For example, in certain embodiments, the requests and responses are formatted in accordance with Video Ad Serving Template (VAST) standards where appropriate, although other formatting may be used.

The processor 154 of the exchange server 150 is also configured to send, to each of the plurality of advertisement servers 130, a right-to-bid request that is based on the advertisement request. By being able to request advertisements from a plurality of advertisement servers 130, the exchange server 150 advantageously has access to a large inventory of advertisements commensurate with the inventories of each of the advertisement servers 130. The right-to-bid request is transmitted using the respective communications modules 156 and 138 of the exchange server 150 and the advertisement server 130.

In certain embodiments, the right-to-bid request sent by the exchange server 150 to each of the advertisement servers 130 includes an IP address, advertisement information, pricing information, publisher site information, inventory information, a time (e.g., a current time of day or "daypart"), a cookie mapping of the exchange cookie's identifier (ID) to the ad server's cookie ID, or other client information. The exchange cookie's ID may be a private identifier for the client 102 by the exchange server 150, while the ad server's cookie ID may be a local identifier of the client 102 by the ad server 130. More details of publisher information, client information, and any other information may be described in more details related to FIG. 2.

In certain embodiments, the advertisement server 130 indicates to the exchange server 150 that it does not want to receive certain right-to-bid requests, and such indicators are stored in the exchange rules 158. For example, a certain advertiser associated with the advertisement server 130 may not want to receive over a certain number of right-to-bid requests, or right-to-bid requests associated with violent content, and so an appropriate filter may be established in the exchange rules 158 in the memory 152 of the exchange server 150.

The processor 154 of the exchange server 150 is further configured to receive, from each of the plurality of advertisement servers 130, a response to the right-to-bid request. Each response includes an indicator of a bid price or a pass (or a "no advertisement" response). The response is based on advertisement server rules 134 (or "set of advertisement rules") stored in the memory 132 of the respective advertisement server 130. Other server rules 134 taken into consideration when generating the response include, for example, frequency cap rules (e.g., how many times serve an advertisement to a user), pacing rules (e.g., serving a certain volume of advertisements for an advertisement campaign over a certain time period), flight date rules (e.g., start and end dates for an advertisement campaign), and targeting rules (e.g., geographic targeting, advertisement or site category information, user value information, bundle information). The targeting rules may indicate, for example, that the advertiser does not want to bid on placing advertisements on certain publisher sites, such as where the buyer seeks to place advertisements for a first service, but does not wish to place those advertisements on the publisher site of a competing service.

In certain embodiments, each response to the right-to-bid request sent by the advertisement server 130 further includes information on a bid advertisement (i.e., the advertisement the response is bidding on to have played on the client 102) or a tracking module. Exemplary information on the bid advertisement includes the bid advertisement to display, a location from which the bid advertisement can be obtained and/or displayed, a companion (e.g., banner) to display with the bid advertisement, destination information (e.g., actions to take if the bid advertisement is activated or "clicked"), and bid advertisement format information (e.g., the size, type, frame rate, aspect ratio, dimensions, and/or duration of the bid advertisement). In certain embodiments, the response to the right-to-bid request includes goal information. For example, the goal information may indicate that an advertiser wants to generate a certain cluster rate, so the exchange server 150 would automatically run advertisements for the advertiser until certain cost per click rate or conversion rate is reached. As another example, the goal information may indicate that the advertiser wants to try to have a certain price cost per impression or payment goals, which would then be handled by the exchange server 150. By way of another example, the tracking module may indicate whether the client 102 has visited a related site before. If the client 102 has visited a related site, a first bid advertisement associated with the related site may be offered, but if the client 102 has not visited the related site, a second bid advertisement not associated with the related site may be offered.

The processor 154 of the exchange server 150 is also configured to select, based on the exchange rules 158, the winning response from the plurality of responses to the right-to-bid requests. In certain embodiments, the set of exchange rules 158 comprises rules associated with a publisher site 116 on which to display the advertisement, pricing information, or advertisement format information. Exemplary exchange rules 158, include, by way of example and without limitation, whether (1) the placement of the advertisement on the publisher site 116 will match one, many, or all of the targeting criteria for the advertisement (e.g., geographical location, time of day, channel, site quality), (2) the advertisement is being placed at a rate that it should be eligible for bidding, (3) the advertisement is within all flighting and pricing/budget constraints, (4) the bid (e.g., payment) to place the advertisement on the publisher site 116 clears any existing publisher site 116 placement minimum bid acceptance price (or "floor"), for example, when the exchange server 150 subtracts a cost (or "revenue share") for placing the advertisement, and (5) whether the bid is the highest bid among all available bids included in the received responses. Additional exemplary exchange rules 158 include whether (6) the publisher site 116 is active, (7) publisher site information, such as the owner or content of the publisher site 116 (e.g., to avoid placing an advertisement for a company on the site of a rival company), whether it is syndicated (e.g., to place advertisements for a specific product in a category on a first publisher site 116, but place advertisements for any product in the category on syndicated publisher sites of the first publisher site 116), and whether the publisher site 116 accepts advertisements in a certain category (e.g., a children's publisher site not accepting tobacco advertisements), (8) advertisement format (e.g., whether the bid advertisement is too long or too short for placement on the publisher site 116), and (9) exchange server pricing information (e.g., revenue share—if the exchange server 150 extracts a certain cost for connecting the advertisement server 130 response to the client 102, then determining whether, after the cost is extracted, the bid price is sufficient to win).

Although the architecture 100 of FIG. 1A illustrates a plurality of advertisement servers 130 each having advertisement server rules 134 stored separately and remotely from the exchange server 150, in certain embodiments, each advertisement server 130 may store its respective advertisement server rules 134 in the memory 152 of the exchange server 150. In these embodiments, the exchange server 150 does not need to send a right-to-bid request to the advertisement server 130, but instead determines which advertisement will win the right to be displayed on the client 102 based on the locally stored advertisement server rules 134, for each advertisement server 130, stored locally in the memory 152 of the exchange server 150.

Figure 1B:
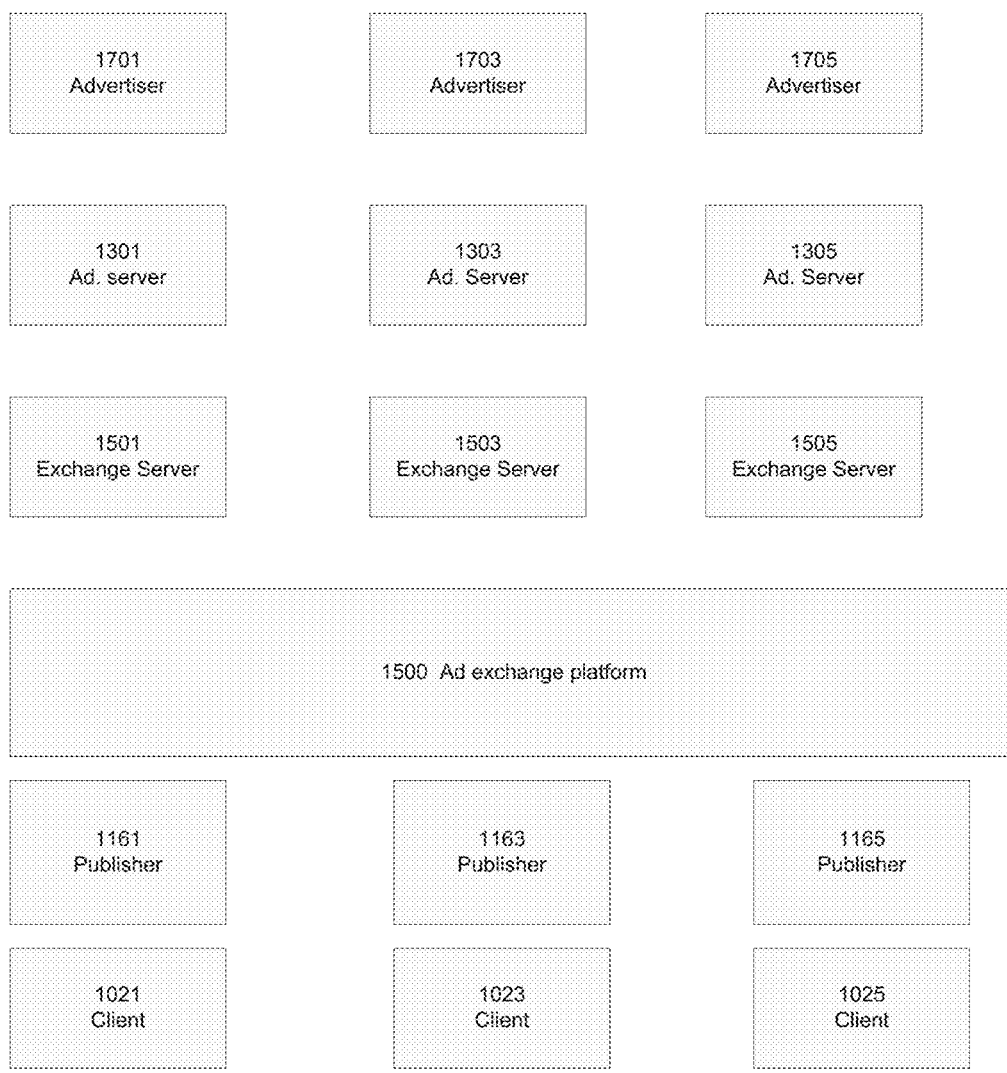

FIG. 1B depicts another version of advertisement exchange system 100 with multiple clients such as a client 1021, a client 1023, and a client 1025. Multiple publishers, such as a publisher 1161, a publisher 1163, and a publisher 1165, may be web sites being viewed on the client 1021, the client 1023, and the client 1025 respectively. The advertisement exchange part may include an advertisement exchange platform 1500 in addition to a few exchange servers such as an exchange server 1501, an exchange server 1503, and an exchange server 1505. The advertisement exchange platform 1500 together with the exchange server 1501, the exchange server 1503, and the exchange server 1505 may be multiple instances of the exchange server 150 shown in FIG. 1A implemented in a combination of hardware and software. There may be multiple advertisement servers such as an advertisement server 1301, an advertisement server 1303, an advertisement server 1305, communicating with the exchange servers such as the exchange server 1501, the exchange server 1503, and the exchange server 1505. Finally, one or more advertisers such as an advertisers 1701, an advertisers 1703, and an advertisers 1705 may communicate with the advertisement server 1301, the advertisement server 1305, and the advertisement server 1307 to place the advertisements. Therefore through the various components showing in FIG. 1B, an advertiser 1701 can be connected to a publisher 1161 and place an advertisement on a device of the user 1021. The number of components shown in FIG. B is only for illustration purposes and is not limiting.

Figure 1C:
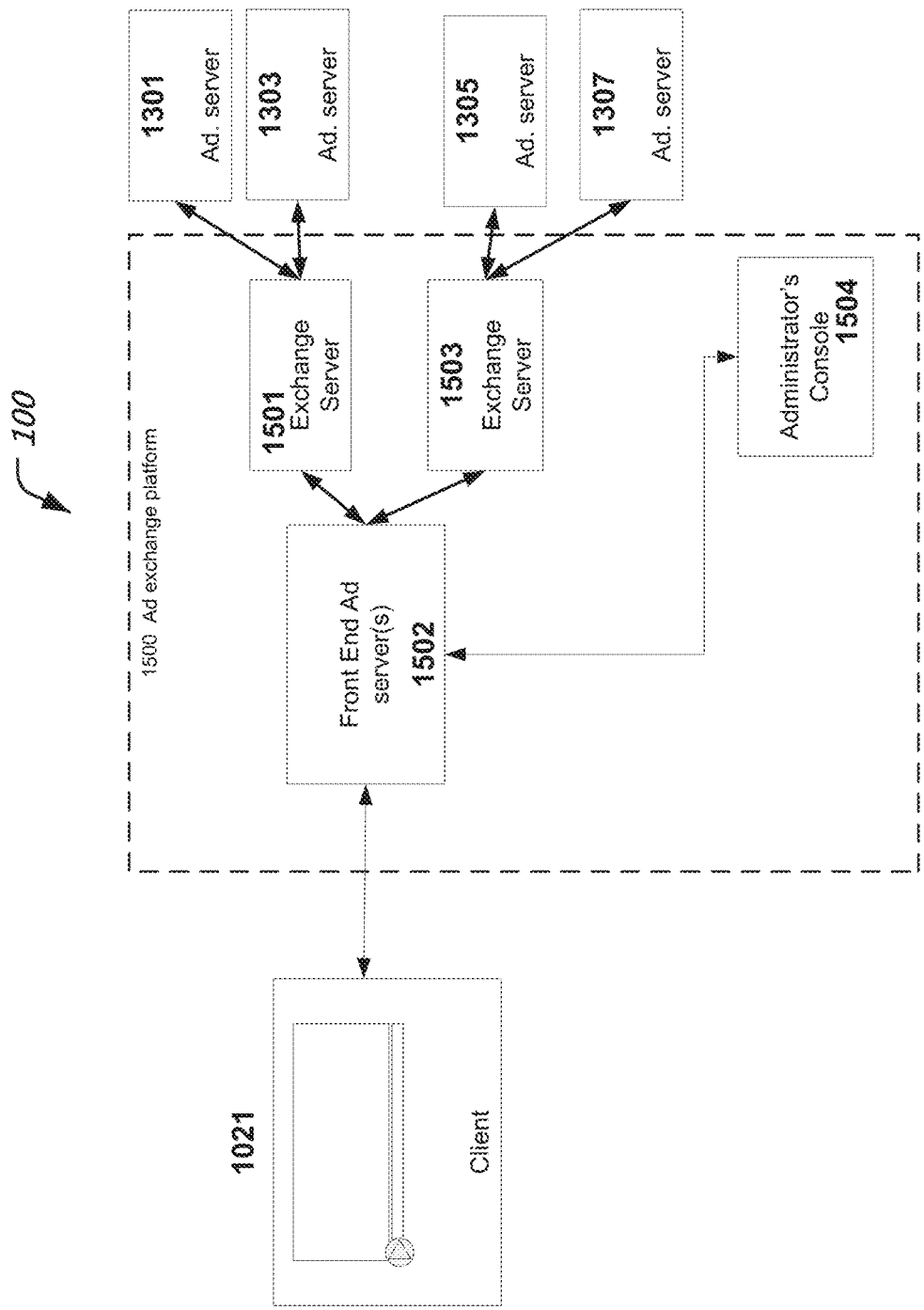

FIG. 1C depicts another system view of an advertisement exchange system 100 that can accommodate the disclosed embodiments. A client 1021 may be communicatively coupled (e.g., via the internet and a wired or wireless connection) with an advertisement server 1301, an advertisement server 1303, an advertisement server 1305, and an advertisement server 1307, through the advertisement exchange platform 1500 including an exchange server 1501, and an exchange server 1503. The ad servers such as the ad server 1301 may communicate bids to show an ad such as a video ad to the device 1021 to multiple bidders via a plurality of exchange server 1501 or 1503. An operator or administrator console 1504 may be provided to control the operation of the ad server 1301 and exchange server 1501. The ad server 1301 may also call a front end ad server 1502 to provide an entry into the advertisement exchange platform 1500 for an ad placement request from the client 1021.

Figure 2:
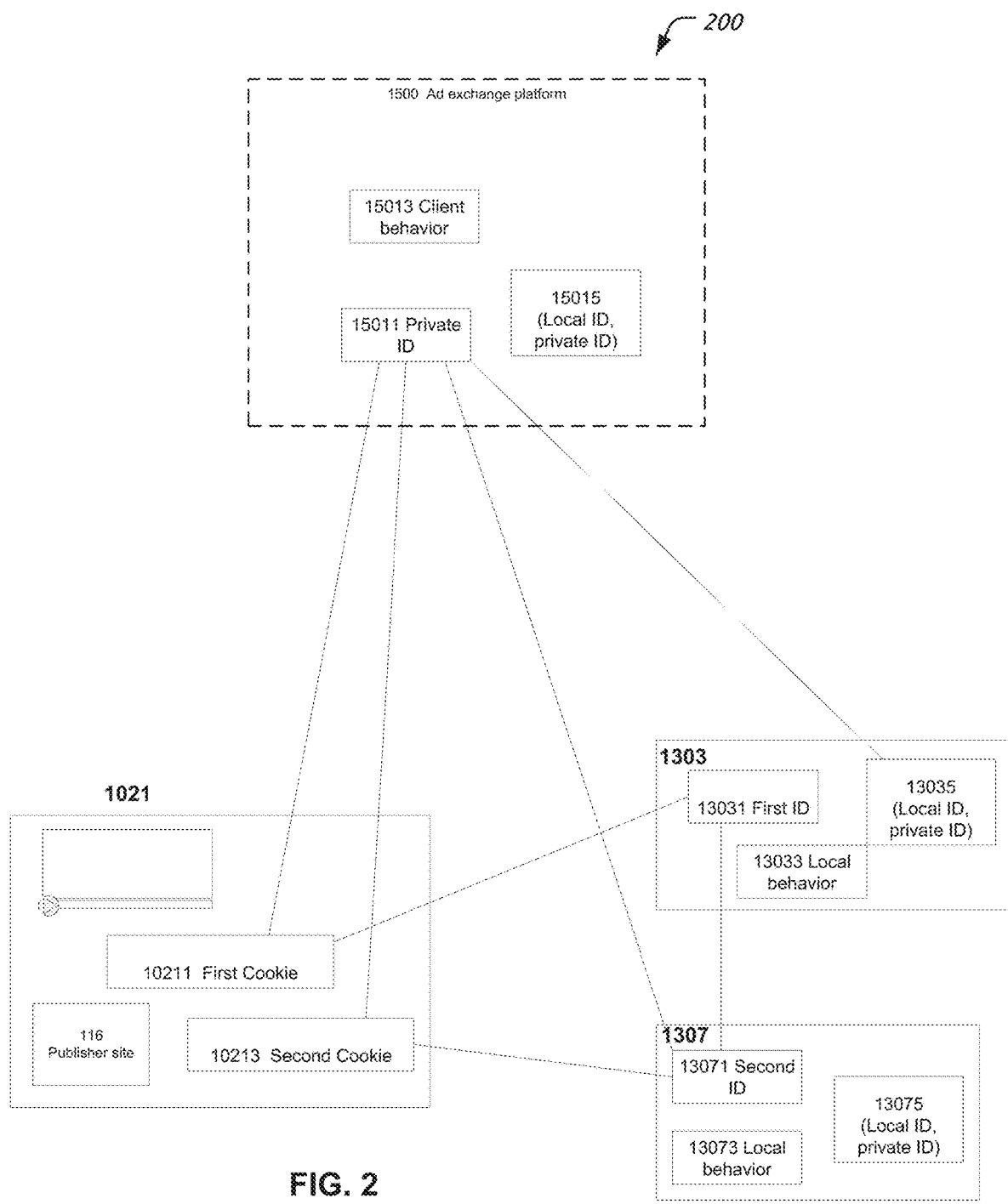
FIG. 2 illustrates an exemplary storage used in an advertisement exchange system.

As illustrated in FIG. 2, besides competing to bid on the advertisement exchange platform 1500, different advertisement servers such as an advertisement server 1303 and an advertisement server 1307 may communicate to each other, share information, and work together to provide advertisement to the client 1021.

For example, the client 1021 may have a set of behavior data. The ad server 1303, the ad server 1307, and the ad exchange platform 1500 may each save a set of behavior for the client 1021, such as a client behavior 15013, a local behavior 13033 in the ad server 1303, and a local behavior 13073 in the ad server 1307. The client behavior 15013, the local behavior 13033, and the local behavior 13073 may include various information associated with the client 1021. Giving the large amount of behavior data associated with the client 1021, sometimes it is advantageous to save a large part of the behavior data in the client behavior 15013 which is in a centralized location, rather than the local behavior 13033 and the local behavior 13073 which may be only accessible to the ad server 1303 and the ad server 1307 respectively. The components shown in FIG. 2 are only for illustration purpose and are not limiting. For example, it is possible that all behavior data is saved in client behavior 15013, and the local behavior 10373 and the local behavior 13033 are both empty. Many other combinations are possible and are included in the scope of this disclosure.

The client behavior 15013, the local behavior 13033, and the local behavior 13073 may include an IP address, advertisement information, pricing information, inventory information, a time (e.g., a current time of day or "daypart"), publisher site information, or other client information.

As an example, the client information included in the client behavior 15013, the local behavior 13033, and the local behavior 13073 can include a geographic location of the client (e.g., obtained based on the client's Internet Protocol (IP) address), the client online community. For example, client information may include, obtained using tracking modules, that the client is a friend with certain people that are known to have a certain behavior.

As an example, the publisher site information can include behavioral targeting information, such as contextual data obtained from searching the Internet to obtain information on the publisher site 116 (e.g., the publisher site 116 address, the publisher site 116 is about a certain topic, and because the advertisement request is originating from the publisher site 116, an advertiser may seek to place an advertisement relevant to the topic on the publisher site 116). As another example, the publisher site information can indicate that the publisher site 116 is demographically targeted to eighteen year old males. Other exemplary publisher site information includes a historical value of placing an advertisement on the publisher site 116 (e.g., a historical clearing price for the publisher site 116 that indicates, for example, that a certain bidding price would likely win, or an average bidding price for the publisher site 116 over a certain time period), site property information (e.g., whether the publisher site 116 is a web site, a software application, a video game, a television channel, etc.), bundle information (e.g., whether a publisher site 116 is part of a group of sites that share a common feature, such as being highly frequented or targeted toward a certain audience), and quality information (e.g., whether the publisher site 116 is a broadcast site, professionally developed, user generated, etc.). As yet a further example, publisher site information can include information on the value of the publisher site 116 to advertisers, such as a historical quality score or value of the placement of the advertisement on the publisher site 116 to the advertiser based on predetermined metrics (e.g., how the publisher site 116 has performed, advertisement conversion information, advertisement click information, advertisement finish-rate information).

Since there may be many clients and many ad servers, an identification method may be needed for the system shown in FIG. 2. For example, the client 1021 may be identified by the ad server 1303 using a first identifier 13031 related to a first cookie 10211, and by the ad server 1307 using a second identifier 13071 related to a second cookie 10213, and it may be identified using a private identifier (ID) 15011 by the ad exchange platform 1500. The above is just for illustration purpose, the first identifier 13031, the second identifier 13071, and the private identifier 15011 may be done in other ways instead of cookies placed on the client 1021.

The private ID 15011 for the client 1021 may be unique that it can be used to identify the client 1021 for its operations among many ad servers, while one or more local identifiers, such as the first ID 13031, and the second ID 15011 are saved on individual ad servers, one in each ad server. The private ID 15011 may be a string of numbers such as an integer of 128 bits long. The private ID 15011 may be in some other forms as well.

A table 15015 may be kept in the advertisement exchange platform 1500, where an entry of the table 15015 may be a pair of a private ID 15011 of a client 1021 and a local ID, such as the first ID 13031 of the client 1021 in an ad server, such as the ad server 1303. The table 15015 may be implemented in the memory, in the cache, or in a more permanent storage attached with the ad exchange platform 1500.

When the ad server 1303 communicates with the ad server 1307 about the client 1021, it may just pass the first ID 13031 to the ad server 1307. The ad server 1307 may not know the private ID associated with the first ID 13031. The ad server 1307 may communicate with the ad exchange platform 1500 to find out the private ID associated with the first ID 13031. Once the ad server 1307 has found out the associated private ID, the ad server 1307 may save the pair of a local ID and the associated private ID in a table, such as the table 13075. A similar table 13035 may be constructed for the ad server 1303.

At another time, when another ad server communicates a local ID to the ad server 1307 again, the ad server 1307 may search the table 13075 first to see whether the local ID is stored in the table 13075 or not. If the local ID is found in the table 13075, then the ad server 1307 can find the private ID for the local ID in the table 13075. Once the private ID for the client is found, the ad server 1307 may further retrieve, locally or through the network, a set of behavior, such as the client behavior 15013, stored in the ad exchange platform 1500 corresponding to the private ID. The ad server 1307 may further distribute an advertisement to the client device 1021 based on the retrieved client behavior 15013. In this way, the ad servers can work together with the ad exchange platform 1500 to provide advertisement to the client 1021 to achieve a better result.

The table 13075 can serve as a cache table and may have a smaller size than the table 15015. The table 13075 may be made up of a pool of entries. Each entry has a datum (piece of data). The datum of an entry for the table 13075 may comprise a local ID and its associated private ID. When the ad server 1307 receives a first ID 13031 from the ad server 1303, the ad server 1307 may search the cache table 13075 at a location of the table 13075. The searched location may be determined by one or more hashing functions.

If the searched first ID 13031 is found in the table 13075, which is called a cache hit, the ad server 1307 may read the found entry for the first ID 13031. If the searched first ID 13031 is not found in the table 13075, which is called a cache miss, the ad server 1307 may evict or remove some other entry in order to make room for the first ID 13031. The heuristic used to select the entry to eject is known as the replacement policy or eviction criterion. The server 1307 may insert the first ID 13031 and its associated private ID into the table 13075 based on an eviction criterion. More details are shown in FIG. 3 for the lookup and insertion.

Figure 3:
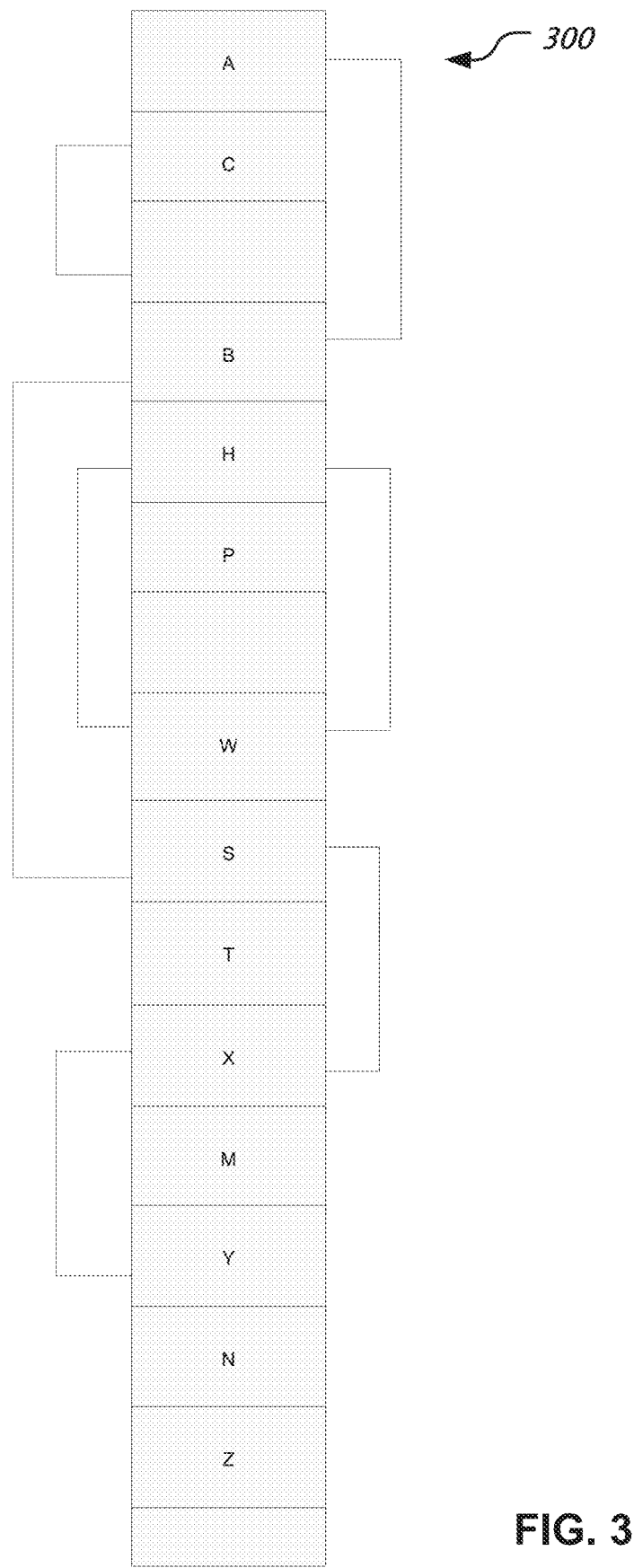
FIG. 3 illustrates an exemplary insertion process for an exemplary storage.

FIG. 3 illustrates a storage 300 with a set of entries such as A, C, B, and so on, which may be the one implemented in the table 13075. The storage 300 may store data so that future requests for that data can be served faster. The storage 300 may be a cache, which is being used interchangeably to mean any storage memory in this document. Generally, the data that is stored within a cache might be values that have been computed earlier or duplicates of original values that are stored elsewhere. For example, if the cache 300 is used in the ad server 1307 as the table 13075, the data stored in the cache 300 may be duplicated in the table 15015 in the ad exchange server 1500. If requested data is contained in the cache (cache hit), this request can be served by simply reading the cache, which is comparatively faster. Otherwise (cache miss), the data has to be recomputed or fetched from its original storage location, which is comparatively slower. Hence, the greater the number of requests that can be served from the cache, the faster the overall system performance becomes.

The cache 300 may be implemented in a storage of a computer system, which may be or may not be in the cache of the main memory system. The cache 300 and its operations described below may have many applications, including a disk cache, a web cache, a CPU cache, caches mapping of domain names to IP addresses, and many other applications. Operations of the cache 300 described below may work for a standalone system as well as a networked system such as the ad server 1307 and the ad server 1303 shown in FIG. 2. For example, if the whole system comprises only one server 1307 shown in FIG. 2, the method described below will still work as a method to manage a cache using hashing functions and an eviction criterion.

When a key is received to look up in the cache 300, the key may be from the same computing device the cache 300 is located, or from a device communicating to the cache 300 through a network. As shown in FIG. 2, the key may be a local identifier, and an entry in the cache 300 may be a pair of a local identifier and its associated private identifier. One or more hashing functions may be used to determine the location of the key in the cache 300.

When two hash functions are used instead of only one to determine the possible location of the key in the cache 300, there are two possible locations in the cache 300 for the key. Therefore lookup can be accomplished by inspection of just two locations in the cache 300, which takes a constant time in the worst case. In one embodiment, the cache 300 may be split into two smaller tables of equal size or different sizes, and each hash function provides an entry into one of these two tables. In some other embodiment, more than two hashing functions can be used to determine a location for the key. In yet some other embodiment, more than one key may be stored in an entry, such as up to a fixed number of keys may be stored in an entry of the cache 300.

When the key is not found in the cache 300 (a cache miss) using the two hashing functions and needs to be inserted, a greedy algorithm may be used: the key is inserted in one of its two possible locations, "kicking out", that is, displacing or evicting, any key that might already reside in this location. This displaced key is then inserted in its alternative location, again kicking out any key that might reside there, until a vacant position is found, or some more actions may be taken as described below when there is a loop found.

As illustrated in FIG. 3, the lines connecting two entries show the alternative location of each key based on two hashing functions. For example, a key would be inserted in the location of C by moving C to its alternative location which is vacant. In another case, a key may be inserted in the location of A by moving A to its alternative location, currently occupied by B, and moving B to its alternative location occupied by S, and this process may continue for a long time as shown in FIG. 3, that S is moved to a location occupied by X, X is move to a location occupied by Y, and so on. In another case, an insertion of a key in the location occupied by H would move H to the location occupied by W and then move W back to H, which goes to a loop.

In an embodiment, during the insertion of a key, a fixed delay method may be used to guarantee the insertion takes less than or equal to a fixed or a constant time in the worst case. The fixed delay time includes the time needed for inserting the key, and then finding new locations for displaced keys during the insertion process, which may be operations related to inserting the key or operations resulting in inserting the key. The fixed delay method can avoid the rebuilt of the cache 300 when a loop is encountered, which may be time consuming and disruptive.

In an embodiment, the key may have an associated time stamp. The associated time stamp may be a time the key is created, or a time the key will expire, or some other time indication. The fixed delay time insertion for the key may guarantee the insertion of the key and its related operations are accomplished within a fixed amount of time interval calculated based on the time stamp associated with the key. Alternatively, the fixed delay time insertion for the key may guarantee the insertion of the key and its related operations are accomplished within a fixed number of steps.

For example, for the insertion process shown in FIG. 3, a key may be inserted in the location of A by moving A to its alternative location, currently occupied by B, and moving B to its alternative location occupied by S, and this process may continue to move S to a location occupied by X, move X to a location occupied by Y, and so on. If the keys A, B, S, X, Y each has an associated time stamp, and one of them is expired with respect to a given interval or by some other means, then the position occupied by the expired key would be treated as the position is vacant, and a displaced key can be stored in that position.

Alternatively, the fixed delay time insertion method may set an upper limit as how many steps the method will look into the insertion process. For example, the fixed delay time insertion method can limit to inspect 3 times the evicted key and find a location to place the evicted key. For the example shown in FIG. 3, if only 3 steps are inspected, then for the insertion process that moving A to its alternative location, currently occupied by B, and moving B to its alternative location occupied by S, moving S, the method will stop at location occupied by S since it is already 3 steps and evict the key S. If a fixed number of steps are inspected to guarantee a fixed delay, then it may be applicable to cache storing keys without associated time stamp.

The fixed number of steps insertion process can also resolve the loop between the keys W and H shown in FIG. 3. Alternatively, loops during the insertion of the key can be resolved by other mechanism such as a detection of a loop using a linked list.

In addition, the example methods may be combined to generate other methods to guarantee the fixed delay time insertion. For example, the method may evict a key in the insertion process if a key is expired based on its associated time stamp, without reaching to the maximum steps allowed. If after the maximum number of steps of inspection have been performed and no key is expired, then the method can evict the key in the last position inspected.

Other variations of the methods can exist. For example, instead of evicting a key with expired time, the method can check the keys and evict the one with a time stamp that is closest to its expiration time among all locations been inspected during operations related to inserting the key. The closest to expiration time may be calculated based on the creation time of the keys, or giving at the time of the time stamp, or some other means.

Figure 4:
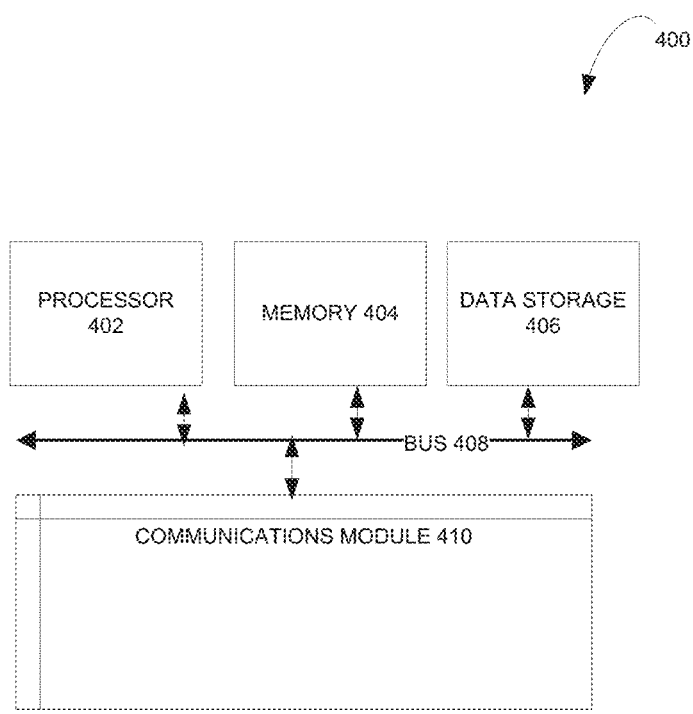
FIG. 4 illustrates a block diagram showing an example of a computer system with which the advertisement exchange system can be implemented.

FIG. 4 shows an exemplary computing machine that can implement components of the system shown in FIGS. 1A-1C, FIG. 2 and methods shown in FIG. 3. The term "machine-readable medium" as used herein refers to any medium or media that participates in providing instructions to processor 402 for execution. Such a medium may take many forms, including, but not limited to, non-volatile media, volatile media, and transmission media. Non-volatile media include, for example, optical or magnetic disks, such as data storage device 406. Volatile media include dynamic memory, such as memory 404. Transmission media include coaxial cables, copper wire, and fiber optics, including the wires that comprise bus 408. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read.

The disclosed systems and methods provide an advertisement exchange that processes, in near real-time and based on respective sets of rules, a request for video advertisements from a publisher site being displayed on a client, responses from a plurality of advertisement servers seeking to serve an advertisement for a bid price in response to the request, and providing the winning advertisement to the client so that it is displayed on the client.

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

What is claimed is:

1. A device comprising:
a storage that stores a set of entries; and
a processor configured to:
  receive a first key; and
  insert the first key into two locations within the set of entries,
  wherein the two corresponding locations are determined based on at least a first hashing function, a second hashing function, and an eviction criterion for evicting collided hashed values of the first key; and
wherein the processor is configured to:
  calculate a fixed delay, based on a time stamp associated with the first key, that bounds an insertion time for operations resulting in inserting the first key, the fixed delay associated with a fixed number of steps to move keys, within the set of entries, in association with the inserting the first key;
  responsive to inserting the first key in a first location, within the set of entries, of a second key and determining that the fixed number of steps have not been performed in association with the inserting the first key, move the second key to a second location, within the set of entries, of a third key;
  responsive to moving the second key to the second location and determining that the fixed number of steps have not been performed in association with the inserting the first key, move the third key to a third location, within the set of entries, of a fourth key; and
  responsive to (i) moving the third key to the third location, (ii) determining that the fixed number of steps have been performed in association with the inserting the first key and (iii) determining that no keys associated with the inserting the first key are expired:
    evaluate a plurality of locations associated with inserting the first key, including the second location and the third location, to determine which location of the plurality of locations has a key that is closest to an expiration time of the key but is not yet expired based on an evaluation of a time stamp of each key of the plurality of locations and an expiration time for each key of the plurality of locations; and
    evict the key in the determined location of the plurality of locations.

2. The device of claim 1, wherein the evaluating the plurality of locations comprises:
  evaluating a fourth location that has a fifth key that is not yet expired to determine how close the fifth key is to a fourth expiration time of the fifth key; and
  evaluating a fifth location that has a sixth key that is not yet expired to determine how close the sixth key is to a fifth expiration time of the sixth key.

3. The device of claim 1, wherein the evaluating the plurality of locations comprises:
  evaluating the second location that has the second key that is not yet expired to determine how close the second key is to a second expiration time of the second key; and
  evaluating the third location that has the third key that is not yet expired to determine how close the third key is to a third expiration time of the third key.

4. The device of claim 1, wherein the first key includes a first local identifier, an entry in the set of entries includes a second local identifier and at least one private identifier, and the first key is inserted into the set of entries with a private identifier associated with the first key.

5. The device of claim 4, wherein the first local identifier is an identifier of a client device by a first system, and the private identifier is an identifier of the client device by a second system.

6. The device of claim 5, wherein the private identifier is stored in the second system connected to the device by a network.

7. The device of claim 6, wherein the processor is configured to:
  retrieve through the network a set of behavior stored in the second system corresponding to the private identifier; and
  distribute an advertisement to the client device based on the set of behavior.

8. The device of claim 1, wherein:
  the plurality of locations associated with inserting the first key comprises all locations inspected during operations related to the inserting the first key.

9. The device of claim 1, wherein: the eviction criterion for evicting collided hashed values of the first key is to evict an entry in a location inspected at a fixed number of step.

10. The device of claim 1, wherein:
  each entry in the set of entries has a respective associated time stamp; and
  the eviction criterion for evicting collided hashed values of the first key is to evict an entry in a location that is closest to its expiration time among all locations been inspected during operations resulting in inserting the first key.

11. A method for a hashing table, comprising:
  receiving, by a device, a first key;
  inserting the first key, by a processor of the device, into two locations within a set of entries stored in a storage of the device,
    wherein the two locations are determined by at least a first hashing function, a second hashing function, and an eviction criterion for evicting collided hashed values of the first key; and
    wherein a fixed delay that is calculated based on a time stamp associated with the first key bounds an insertion time for operations related to inserting the first key, the fixed delay associated with a fixed number of steps to move keys, within the set of entries, in association with the inserting the first key;

responsive to inserting at least one key in a first location, within the set of entries, of a second key and determining that the fixed number of steps have not been performed in association with the inserting the first key, moving the second key to a second location, within the set of entries, of a third key; and responsive to (i) moving the second key to the second location, (ii) determining that the fixed number of steps have been performed in association with the inserting the first key and (iii) determining that no keys associated with the inserting the first key are expired:

evaluating a plurality of locations associated with inserting the first key, including the second location, to determine which location of the plurality of locations has a key that is closest to an expiration time of the key but is not yet expired based on an evaluation of a time stamp of each key of the plurality of locations and an expiration time for each key of the plurality of locations; and evicting the key in the determined location of the plurality of locations.

12. The method of claim 11, wherein the fixed delay is associated with a fixed time interval, and the insertion time for operations related to inserting the first key is within the fixed time interval.

13. The method of claim 11, wherein the inserting the first key comprises inserting the first key into the set of entries with a private identifier associated with the first key.

14. The method of claim 11, wherein the first key includes a first local identifier, an entry in the set of entries includes a pair of a second local identifier and at least one private identifier, and the first key is inserted into the set of entries with a private identifier associated with the first key.

15. The method of claim 14, wherein the first local identifier is an identifier of a client device by a first system, and the private identifier is an identifier of the client device by a second system.

16. The method of claim 15, wherein the private identifier is stored in the second system connected to the device by a network.

17. The method of claim 16, comprising:

retrieving, by the processor of the device and through the network, a set of behavior stored in the second system corresponding to the private identifier; and distributing, by the processor of the device, an advertisement to the client device based on the set of behavior.

18. The method of claim 11, wherein:

the eviction criterion for evicting collided hashed values of the first key is to evict an entry inspected during operations related to inserting the first key that is expired based on its associated time stamp.

19. The method of claim 11, wherein: at least one entry in the set of entries comprises an identifier of a client device, the method comprising:

retrieving a set of behavior corresponding to the identifier; and distributing an advertisement to the client device based on the set of behavior.

20. The method of claim 11, wherein:

the plurality of locations associated with inserting the first key comprises all locations inspected during operations related to the inserting the first key.

21. A device comprising:

a storage storing a set of entries; and a processor configured to:

receive a first key; and insert the first key into two locations within the set of entries, wherein the two locations are determined by at least one of a first hashing function, a second hashing function, or an eviction criterion for evicting collided hashed values of the first key; and wherein the processor is configured to:

calculate a fixed delay, based on a time stamp associated with the first key, that bounds an insertion time for operations related to inserting the first key;

responsive to inserting at least one key in a first location, within the set of entries, of a second key and determining that a limit of the fixed delay has not been met in association with the inserting the first key, move the second key to a second location, within the set of entries, of a third key; and responsive to (i) moving the second key to the second location, (ii) determining that the limit of the fixed delay has been met in association with the inserting the first key and (iii) determining that keys associated with the inserting the first key are not expired:

evaluate a plurality of locations associated with inserting the first key, including the second location, to determine which location of the plurality of locations has a key that is closest to an expiration time of the key but is not yet expired based on an evaluation of at least one of a time stamp of each key of the plurality of locations or an expiration time for each key of the plurality of locations; and evict the key in the determined location of the plurality of locations.

22. The device of claim 21, wherein the limit of the fixed delay is a fixed time interval, and the insertion time for operations related to inserting the first key is within the fixed time interval.

23. The device of claim 21, wherein at least one entry in the set of entries comprises an identifier of a client device, the processor configured to:

retrieve a set of behavior corresponding to the identifier.

24. The device of claim 23, wherein the processor is configured to:

distribute an advertisement to the client device based on the set of behavior.

* * * * *